US012349195B2

(12) United States Patent
Klein et al.

(10) Patent No.: US 12,349,195 B2
(45) Date of Patent: Jul. 1, 2025

(54) DEVICES AND METHODS FOR C-BF SEQUENTIAL SOUNDING

(71) Applicant: HUAWEI TECHNOLOGIES CO., LTD., Shenzhen (CN)

(72) Inventors: Arik Klein, Hod Hasharon (IL); Shimon Shilo, Hod Hasharon (IL); Genadiy Tsodik, Hod Hasharon (IL); Oded Redlich, Hod Hasharon (IL); Avner Epstein, Hod Hasharon (IL); Doron Ezri, Hod Hasharon (IL)

(73) Assignee: Huawei Technologies Co., Ltd, Shenzhen (CN)

( * ) Notice: Subject to any disclaimer, the term of this patent is extended or adjusted under 35 U.S.C. 154(b) by 63 days.

(21) Appl. No.: 18/494,540

(22) Filed: Oct. 25, 2023

(65) Prior Publication Data

US 2024/0064811 A1 Feb. 22, 2024

Related U.S. Application Data

(63) Continuation of application No. PCT/EP2021/060783, filed on Apr. 26, 2021.

(51) Int. Cl.
*H04W 74/0816* (2024.01)
*H04B 7/04* (2017.01)

(52) U.S. Cl.
CPC .... *H04W 74/0816* (2013.01); *H04B 7/04026* (2023.05)

(58) Field of Classification Search
CPC ........... H04W 74/0816; H04B 7/04026; H04B 7/0617; H04B 7/024
See application file for complete search history.

(56) References Cited

U.S. PATENT DOCUMENTS

| 2016/0174108 A1* | 6/2016 | Jeong ..................... H04B 7/155 |
| | | 370/315 |
| 2017/0134187 A1* | 5/2017 | Chen .................... H04B 7/0452 |

(Continued)

FOREIGN PATENT DOCUMENTS

| CN | 109547072 A | 3/2019 |
| CN | 113037400 A | 6/2021 |

(Continued)

OTHER PUBLICATIONS

"IEEE Standard for Information technology—Telecommunications and information exchange between systems Local and metropolitan area networks—Specific requirements, Part 11:Wireless LAN Medium Access Control (MAC) and Physical Layer (PHY) Specifications," IEEE Computer Society, Sponsored by the LAN/MAN Standards Committee, IEEE Std 802.Nov. 2016 (Revision of IEEE Std 802. Nov. 2012), total 3534 pages, Institute of Electrical and Electronics Engineers, New York, New York (2016).

Jiang et al., "Channel Sounding for Multi-AP CBF," IEEE 802. 11-20-0123-02-00be, XP068169889, total 15 pages, Institute of Electrical and Electronics Engineers, New York, New York (Jan. 2020).

(Continued)

*Primary Examiner* — Sung S Ahn
(74) *Attorney, Agent, or Firm* — Leydig, Voit & Mayer, Ltd.

(57) ABSTRACT

A wireless access point (AP) is disclosed, which is configured to share a transmission opportunity with at least one further wireless access point within a Multi-AP set using a Coordinated Beamforming (C-BF) scheme. The wireless AP comprises a processing circuitry configured to generate a C-BF Null Data PPDU Announcement (C-BF NDPA) frame, wherein the C-BF NDPA frame comprises a Multi-AP set identifier. Moreover, the wireless AP comprises a communication interface configured to transmit the C-BF NDPA frame to one or more wireless stations associated with the wireless AP and/or to one or more further wireless stations (Continued)

associated with the at least one further wireless AP within the Multi-AP set.

20 Claims, 13 Drawing Sheets

(56) References Cited

U.S. PATENT DOCUMENTS

2018/0206274 A1* 7/2018 Cherian ............... H04B 7/0417
2020/0403680 A1* 12/2020 Li ........................ H04B 7/0695

FOREIGN PATENT DOCUMENTS

| CN | 113395701 A | 9/2021 |
|----|-------------|--------|
| WO | 2020185586 A1 | 9/2020 |

OTHER PUBLICATIONS

"Draft Standard for Information technology Telecommunications and information exchange between systems Local and metropolitan area networks Specific requirements, Part 11:Wireless LAN Medium Access Control (MAC) and Physical Layer (PHY) Specifications, Amendment 1: Enhancements for High Efficiency WLAN," IEEE P802.11ax™M/D8.0, total 820 pages, Institute of Electrical and Electronics Engineers, New York, New York (Oct. 2020).

"Draft Standard for Information technology—Telecommunications and information exchange between systems Local and metropolitan area networks—Specific requirements, Part 11:Wireless LAN Medium Access Control (MAC) and Physical Layer (PHY) Specifications, Amendment 8: Enhancements for extremely high throughput (EHT)," IEEE P802.11be™/DO.1, total 299 pages, Institute of Electrical and Electronics Engineers, New York, New York (Sep. 2020).

* cited by examiner

DEVICES AND METHODS FOR C-BF SEQUENTIAL SOUNDING

CROSS-REFERENCE TO RELATED APPLICATIONS

This application is a continuation of International Application No. PCT/EP2021/060783, filed on Apr. 26, 2021, the disclosure of which is hereby incorporated by reference in its entirety.

TECHNICAL FIELD

Embodiments of the present disclosure relate to wireless communications. More specifically, embodiments of the present disclosure relate to devices and methods for Multi-Access Point (M-AP) coordinated beamforming (C-BF) sequential sounding.

BACKGROUND

IEEE-802.11-based WLANs have become popular at an unprecedented rate. WLANs support a variety of data transfer modes including (but not limited to) file transfer, emails, web browsing and real-time applications such as audio and video applications. For efficiently supporting high throughputs, the evolving IEEE 802.11 standards specify several transmission (TX) schemes that can be used by a wireless transmitter. Particularly useful for increasing the link throughput are TX schemes which deploy multiple TX antennas (some, but not all, also requiring multiple RX antennas on the receiver side, i.e. the wireless receiver), which are so called MIMO modes. Multiple TX antennas can be utilized in different advantageous ways, such as spatial TX diversity for improving the link reliability and performance, beamforming (BF), i.e. focusing the radiated power in the direction(s) of target receiver(s) (and/or suppressing it in undesirable directions, for reducing unwanted interference to non-targeted receivers), and/or spatial multiplexing (SM), i.e. sending multiple data streams simultaneously over the same time-frequency resources, either to the same receiver or to different ones.

SUMMARY 802.11ax (also known as Wi-Fi 6) is the most recent 'Wi-Fi' standard to be approved. Currently, work is underway on the next generation 802.11be (also known as Wi-Fi 7) standard. Multi-AP (M-AP) is a new feature of 802.11be in Release 2 (R2), where only EHT (Extremely High Throughput) APs and EHT Non-AP STAs may support this feature. The main idea of this feature is to enable sharing of a transmission opportunity (TXOP) of a single AP with a set of APs for a concurrent frame exchange. There are several supported coordination schemes, one of them is designated as "Coordinated Beamforming (C-BF)". According to this coordination scheme all the involved APs share the TXOP over the entire BW with their associated STAs. However, in order to avoid the interference to STAs associated with other Overlapping BSSs (OBSS), each participant AP is required to "null" the STAs that are not associated with it so that none of the transmitted PPDUs will create interference to these OBSS STAs (which use the same BW at the same time) while receiving PPDUs from their associated APs. Such "Nulling" operation requires a preceding Coordinated Beamforming (C-BF) Channel Sounding procedure.

It is an objective of the present disclosure to provide devices and methods for supporting C-BF sequential sounding between EHT APs and non-AP EHT STAs within an M-AP set.

The foregoing and other objectives are achieved by the subject matter of the independent claims. Further implementation forms are apparent from the dependent claims, the description and the figures.

Generally, different aspects of the present disclosure are based on the idea to include identifiers in all exchanged frames between EHT AP devices and EHT non-AP devices within a M-AP set in order to support C-BF sequential sounding.

More specifically, according to a first aspect a wireless access point, AP, is provided, wherein once it has obtained a transmission opportunity (TXOP), the wireless AP is configured to share communication resources with at least one further wireless AP within a Multi-AP set using a Coordinated Beamforming, C-BF, coordination scheme. In the following the wireless AP that is sharing its TXOP will be also referred to as the "sharing AP", while the at least one further wireless AP that belongs to the same Multi-AP set and makes use of the TXOP shared by the sharing AP will also be referred to as the "shared AP".

The wireless AP comprises a processing circuitry configured to generate a C-BF Null Data PPDU (Physical Protocol Data Unit) Announcement, C-BF NDPA, frame, wherein the C-BF NDPA frame comprises a Multi-AP set identifier. Thus, in comparison with a conventional NDPA frame the C-BF NDPA frame comprises the Multi-AP set identifier.

Moreover, the wireless AP comprises a communication interface configured to transmit the C-BF NDPA frame to one or more wireless stations associated with the wireless AP and/or to one or more further wireless stations, i.e. the OBSS (Overlapping BSS) wireless stations associated with the at least one further OBSS wireless AP within the Multi-AP set. By including the Multi-AP set identifier in the C-BF NDPA frame, only the OBSS STAs which their associated AP belongs to this M-AP set and are included in the STA Info list field within the eliciting C-BF NDPA frame shall measure the Sounding NDP according to the parameters specified in the C-BF NDPA frame that might be sent by an OBSS AP (i.e. not their associated AP). At a later stage, each of these STAs transmits the feedback channel parameters to the AP that has transmitted the C-BF NDPA frame in order to enable this AP to "null" its data transmissions in the direction of these OBSS STAs. As will be appreciated, in addition to generating and transmitting a C-BF NDPA frame, the wireless AP may be further configured to generate and transmit other variants of NDPA frames to the wireless stations, in particular a conventional EHT NDPA frame.

In a further possible implementation form of the first aspect, the C-BF NDPA frame further comprises an indicator, in particular a flag indicative of the NDPA frame comprising the Multi-AP set identifier and, therefore, not being a conventional NDPA frame, but a C-BF NDPA frame as defined herein.

In a further possible implementation form of the first aspect, the C-BF NDPA frame comprises a sounding dialog token field, wherein the sounding dialog token field comprises the indicator, in particular the flag.

In a further possible implementation form of the first aspect, the sounding dialog token field comprises a plurality of bits, in particular 8 bits, wherein the indicator is one bit, in particular bit 7 of the plurality of bits of the sounding dialog token field.

In a further possible implementation form of the first aspect, the C-BF NDPA frame comprises a Multi-AP set information field, wherein the Multi-AP set information field follows the sounding dialog token field and comprises the Multi-AP set identifier.

In a further possible implementation form of the first aspect, the Multi-AP set information field of the C-BF NDPA frame further comprises an association identifier, AID, with a value greater than 2007 and smaller than 2047 for identifying the Multi-AP set information field as a Multi-AP set information field and not as an associated STA information field identified by a regular AID (i.e. having a value greater than 0 and up to 2007).

In a further possible implementation form of the first aspect, the Multi-AP set identifier is an arbitrary number identifying the set of APs configured for coordinated transmission to which the wireless AP pertains.

In a further possible implementation form of the first aspect, the Multi-AP set information field of the C-BF NDPA frame has a size of 4 bytes.

In a further possible implementation form of the first aspect, the C-BF NDPA frame further comprises at least one C-BF station information field following the Multi-AP set information field, wherein the C-BF station information field has a size of 4 bytes and comprises an association identifier, AID, with a regular value in the range of 0 to 2007 and a BSS color field.

In a further possible implementation form of the first aspect, the at least one C-BF station information field following the Multi-AP set information field may have a size of 8 bytes, wherein the first 4 bytes of the C-BF station information field comprise an associated AP information field and the remaining 4 bytes of the C-BF station information field comprise a EHT station information field (as defined for a conventional EHT NDPA frame).

In a further possible implementation form of the first aspect, the associated AP information field comprises an association identifier, AID, with a special value greater than 2007 and smaller than 2047 for identifying the associated AP information field as an associated AP information field and not as an associated STA information field identified by a regular AID (i.e. having a value greater than 0 and up to 2007).

In a further possible implementation form of the first aspect, the processing circuitry of the wireless AP is further configured to combine, in particular concatenate a plurality of basic service set, BSS, color bits of the wireless AP with one or more least significant bits of a BSS identifier, BSSID, of the wireless AP for obtaining a unique identifier (herein referred to as AP ID) of the wireless AP within the Multi-AP set and to include the unique identifier, i.e. the AP ID of the wireless AP in the C-BF NDPA frame and in the C-BFRP trigger frame.

In a further possible implementation form of the first aspect, the processing circuitry of the wireless AP is further configured to select a plurality of the least significant bits of a basic service set identifier, BSSID, of the wireless AP for obtaining the unique identifier, i.e. the AP ID of the wireless AP within the Multi-AP set and to include the unique identifier, i.e. the AP ID of the wireless AP in the C-BF NDPA frame and in the C-BFRP trigger frame.

In a further possible implementation form of the first aspect, the processing circuitry of the wireless AP is further configured to generate a random number for obtaining the unique identifier, i.e. the AP ID of the wireless AP within the Multi-AP set and to include the unique identifier, i.e. the AP ID of the wireless AP in the C-BF NDPA frame and in the C-BFRP trigger frame.

In a further possible implementation form of the first aspect, the communication interface of the wireless AP is further configured to transmit a Sounding Null Data PPDU (also referred to as Sounding NDP) after a Short Interframe Space (SIFS) duration following the transmission of the C-BF NDPA frame.

In a further possible implementation form of the first aspect, the processing circuitry of the wireless AP is further configured to generate a Coordinated beamforming feedback report poll, C-BFRP, trigger frame, wherein the C-BFRP trigger frame comprises the Multi-AP set identifier and wherein the communication interface of the wireless AP is configured to transmit the C-BFRP trigger frame to the one or more wireless stations associated with the wireless AP and/or to the one or more further wireless stations, i.e. the OBSS wireless stations associated with the at least one further Overlapping BSS wireless AP within the Multi-AP set. The C-BFRP trigger frame is configured to trigger the one or more wireless stations associated with the wireless AP and/or the one or more further wireless stations associated with the at least one further Overlapping BSS wireless AP within the Multi-AP set to transmit a Coordinated beamforming report, i.e. C-BF report frame (herein also referred to as C-BFR frame) to the eliciting wireless AP.

In a further possible implementation form of the first aspect, the processing circuitry of the wireless AP is further configured to receive one or more C-BF report frames from the one or more wireless stations associated with the wireless AP and/or from the one or more further wireless stations associated with the at least one further OBSS wireless AP within the Multi-AP set, wherein each of the one or more C-BF report frames comprises a Multi-AP set identifier.

In a further possible implementation form of the first aspect, the processing circuitry of the wireless AP is configured to process the one or more C-BF report frames received from the one or more wireless stations associated with the wireless AP and/or from the one or more further wireless stations associated with the further OBSS wireless AP, if the Multi-AP set identifier, i.e. the M-AP set identifier value of the one or more C-BF report frames matches the M-AP set identifier, i.e. the M-AP set identifier value of the wireless AP.

According to a second aspect a wireless non-AP station is provided. The wireless non-AP station may be associated with a wireless access point, AP, that is sharing its transmission opportunity (TXOP) or with a further OBSS wireless access point that is being shared a TXOP within a Multi-AP set using a Coordinated Beamforming, C-BF, coordination scheme. The wireless non-AP station comprises a communication interface configured to receive a C-BF NDPA frame from the associated wireless AP or from the at least one further OBSS wireless AP within the Multi-AP set, wherein the C-BF NDPA frame comprises a Multi-AP set identifier. Thus, the C-BF NDPA frame received by the wireless non-AP station in comparison with a conventional NDPA frame comprises the Multi-AP set identifier. As will be appreciated, in addition to receiving a C-BF NDPA frame, the wireless non-AP station may be further configured to receive other variants of NDPA frames from the associated AP, in particular a conventional EHT NDPA frame.

In a further possible implementation form of the second aspect, the communication interface of the wireless non-AP station is further configured to receive a Sounding Null Data PPDU, i.e. Sounding NDP from the associated wireless AP or from the at least one further OBSS wireless AP within the Multi-AP set, wherein the Sounding NDP is transmitted after a SIFS period following the transmission of the C-BF NDPA frame.

In a further possible implementation form of the second aspect, the wireless non-AP station further comprises a processing circuitry configured to generate one or more feedback parameters based on the reception of the Sounding NDP.

In a further possible implementation form of the second aspect, the communication interface of the wireless non-AP station is further configured to receive a Coordinated BF feedback report poll, C-BFRP, trigger frame from the associated wireless AP or from the at least one further OBSS wireless AP within the Multi-AP set, wherein the C-BFRP trigger frame comprises the Multi-AP set identifier.

In a further possible implementation form of the second aspect, the communication interface is further configured to transmit, using the Multi-AP set identifier, a C-BF report, C-BFR, frame to the associated wireless AP or to the at least one further OBSS wireless AP within the Multi-AP set, in response to receiving the C-BFRP trigger frame if the M-AP set value in the soliciting C-BFRP trigger frame is equal to the value of the M-AP set that the associated AP of the non-AP STA is included.

In a further possible implementation form of the second aspect, the C-BF NDPA frame received from the associated wireless AP or from the at least one further OBSS wireless AP, within the Multi-AP set comprises an indicator for comprising the Multi-AP set identifier.

According to a third aspect a method of operating a wireless AP is provided. The wireless AP is configured to share communication resources with at least one further wireless access point within a Multi-AP set using a Coordinated Beamforming, C-BF, coordination scheme, once it has obtained the transmission opportunity. As already described, herein the wireless AP that is sharing its TXOP will be also referred to as the "sharing AP", while the at least one further wireless AP that belongs to the same Multi-AP set and makes use of the TXOP shared by the sharing AP will also be referred to as the "shared AP".

The method comprises the steps of:
generating a C-BF Null Data PPDU Announcement, C-BF NDPA, frame, by the wireless AP (either as a sharing AP or as a shared AP), wherein the C-BF NDPA frame comprises a Multi-AP set identifier; and
transmitting the C-BF NDPA frame to one or more wireless stations associated with the wireless AP and/or to one or more further wireless stations, i.e. the OBSS wireless stations associated with the at least one further OBSS wireless AP within the Multi-AP set. Thus, the C-BF NDPA frame in comparison with a conventional NDPA frame comprises the Multi-AP set identifier, as already described above.

In a further possible implementation form of the third aspect, the method further comprises a step of transmitting a Sounding NDP by the wireless AP (either as a sharing AP or as a shared AP), a SIFS duration after transmitting the C-BF NDPA frame to the one or more wireless stations associated with the wireless AP and/or to the one or more further wireless stations, i.e. the OBSS wireless stations associated with the at least one further OBSS wireless AP within the Multi-AP set.

In a further possible implementation form of the third aspect, the method further comprises the steps of:

transmitting a Coordinated beamforming feedback report poll, C-BFRP, trigger frame by the wireless AP (either as a sharing AP or as a shared AP) to the one or more wireless stations associated with the wireless AP and/or to the one or more further wireless stations, i.e. the OBSS wireless stations associated with the at least one further OBSS wireless AP within the Multi-AP set, wherein the C-BFRP trigger frame comprises the Multi-AP set identifier; and receiving, in response to the Coordinated beamforming feedback report poll, C-BFRP, trigger frame, a C-BF report frame by the wireless AP (either as a sharing AP or as a shared AP) from the one or more wireless stations associated with the wireless AP and/or from the one or more further wireless stations, i.e. the OBSS wireless stations associated with the at least one further OBSS wireless AP within the Multi-AP set, wherein the C-BF report frame comprises the Multi-AP set identifier.

According to a fourth aspect a computer program product is provided, comprising program code which causes a computer or a processor to perform the method according to the third aspect, when the program code is executed by the computer or the processor.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which:

FIG. 3b shows a diagram illustrating the structure of a station information field of the EHT NDPA frame variant of FIG. 3a;

Figure 1:
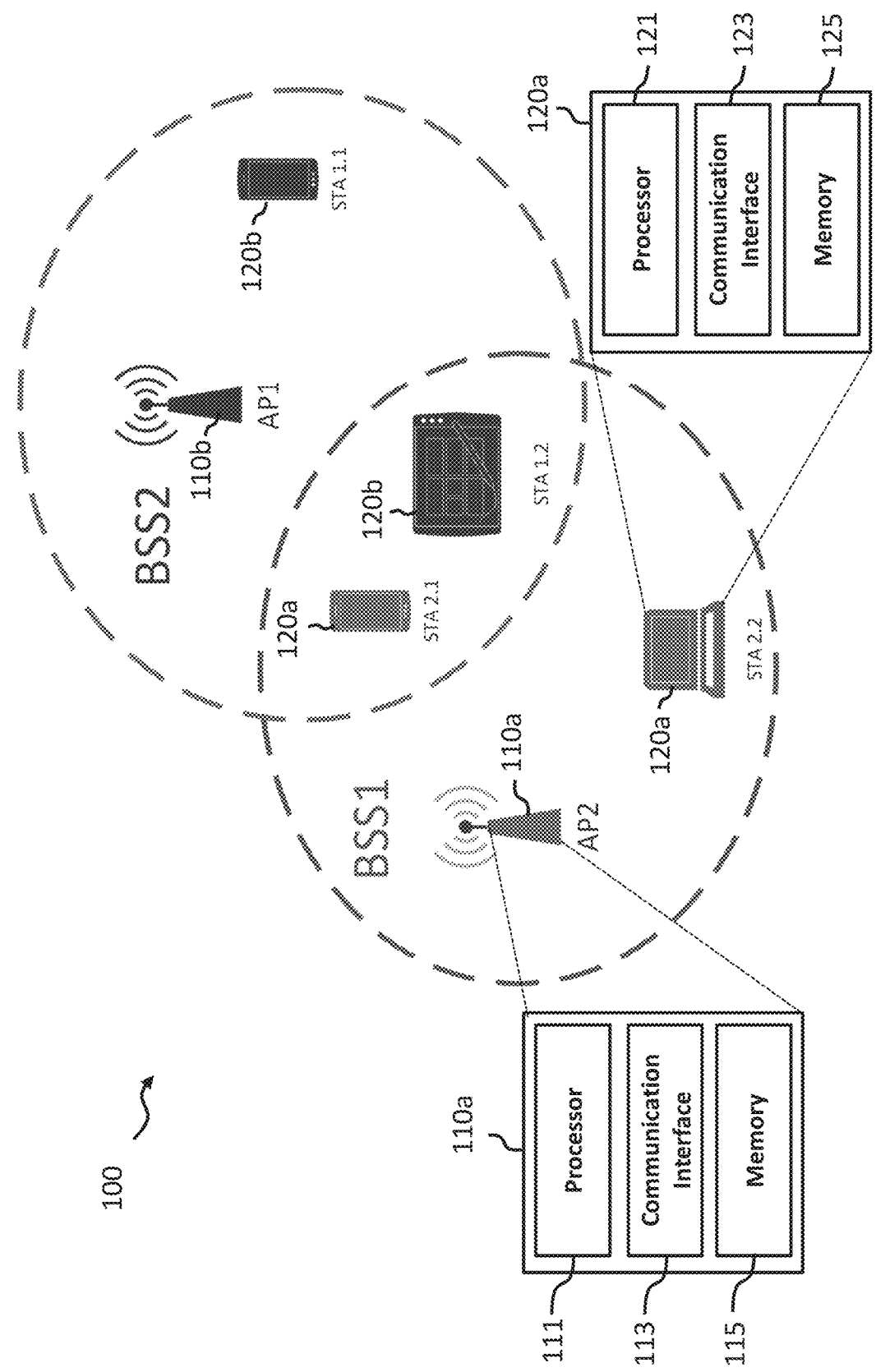
FIG. 1 shows a wireless communication system for M-AP coordinated transmission with sequential sounding, including a wireless AP associated with two wireless non-AP stations forming a first BSS and a further wireless AP associated with two further wireless non-AP stations forming a second BSS.

In the following, identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Before describing different embodiments in more detail, in the following some technical background as well as terminology concerning wireless devices, in particular wireless devices in accordance with the IEEE 802.11 WLAN standard will be introduced making use of one or more of the following abbreviations:

DL Downlink
UL Uplink
BF Beamforming
BSS Basic Serving Set
AP Access Point
PHY Physical Layer
MAC Medium Access Control
TXOP Transmission Opportunity
PPDU PHY Protocol Data Unit
CQI Channel Quality Indication
STA Station (in general, can be either an AP STA or a non-AP STA)
M-AP Multi AP
C-BF Coordinated Beamforming
OBSS Overlapping BSS
OFDMA Orthogonal Frequency Division Multiple Access
NDP Null Data PPDU—a PPDU which contains preamble, including Long Training Fields (LTFs), and no PHY payload which is used for estimating the physical channel between beamformer and beamformee so that the precoder parameters can be computed
NDPA NDP Announcement—a frame which is transmitted before a Sounding NDP, indicating the parameters of the Sounding NDP (e.g. how many LTFs), which STAs need to measure the Sounding report, what parameters should these STAs use for the measurement, etc.
BFR Beamforming Report—a frame which carries the measured feedback/precoding parameters, such as a precoding vector or matrix, SNR corresponding to each precoder, etc.
BA Block-ACK—in 802.11, typically a recipient is expected to respond to a transmission of data or management frame by responding with an ACK; if multiple frames are transmitted within a single PPDU, each has to be acknowledged by a single frame, designated as Block ACK frame and includes indication of ACK for each of the transmitted data/management frames.
TF Trigger Frame—in 802.11ax, the Trigger Frame was introduced as a means to trigger a non-AP STA or multiple non-AP STAs to transmit simultaneously and in synchronized manner to the triggering AP.

FIG. 1 shows a wireless communication system 100 configured for M-AP coordinated transmission with sequential sounding. The wireless communication system 100 comprises two BSS, namely BSS1 and BSS2. Each BSS includes a single AP 110a, 110b and 2 associated STAs 120a, 120b. More specifically, BSS1 comprises the wireless AP 110a (referred to as AP2 in FIG. 1) with the two associated wireless non-AP stations 120a (referred to as STA2.1 and STA2.2 in FIG. 1), while BSS2 comprises the further wireless AP 110b (referred to as AP1 in FIG. 1) with the two associated wireless non-AP stations 120b (referred to as STA1.1 and STA1.2 in FIG. 1). As illustrated in FIG. 1 and as will be described in more detail below, the wireless AP 110a comprises a processing circuitry or processor 111 and a communication interface 113. The wireless AP 110a may further comprise a memory 115. In an embodiment, the further wireless AP 110b may have the same or a similar configuration as the wireless AP 110a. Likewise, the wireless non-AP stations 120a, 120b, such as the wireless non-AP station STA2.2 may comprise a processing circuitry or processor 121, a communication interface 123 and/or a memory 125.

When each BSS of the wireless communication system 100 of FIG. 1 initiates MU-MIMO DL beamformed transmission from the respective AP 110a, 110b to its associated STAs 120a, 120b when a TXOP is obtained, this transmission is usually preceded by a regular sounding procedure. However, when a C-BF M-AP transmission is initiated by the sharing AP (AP2) 110a with the shared AP (AP1) 110b, when the sharing AP (AP2) 110a obtains a TXOP, it shall be preceded by a sequential sounding scheme, which is illustrated in more detail in FIGS. 2a and 2b. Generally, the sequential sounding is started by the sharing AP 110a with its associated STAs 120a and the OBSS STA (which in the example of FIG. 1 is STA 1.2) and follows with a direction to the further wireless AP, i.e. the shared AP 110b to initiate the sequential sounding with its associated STAs 120b and the OBSS (which in the example of FIG. 1 is STA2.1).

Figure 2A:
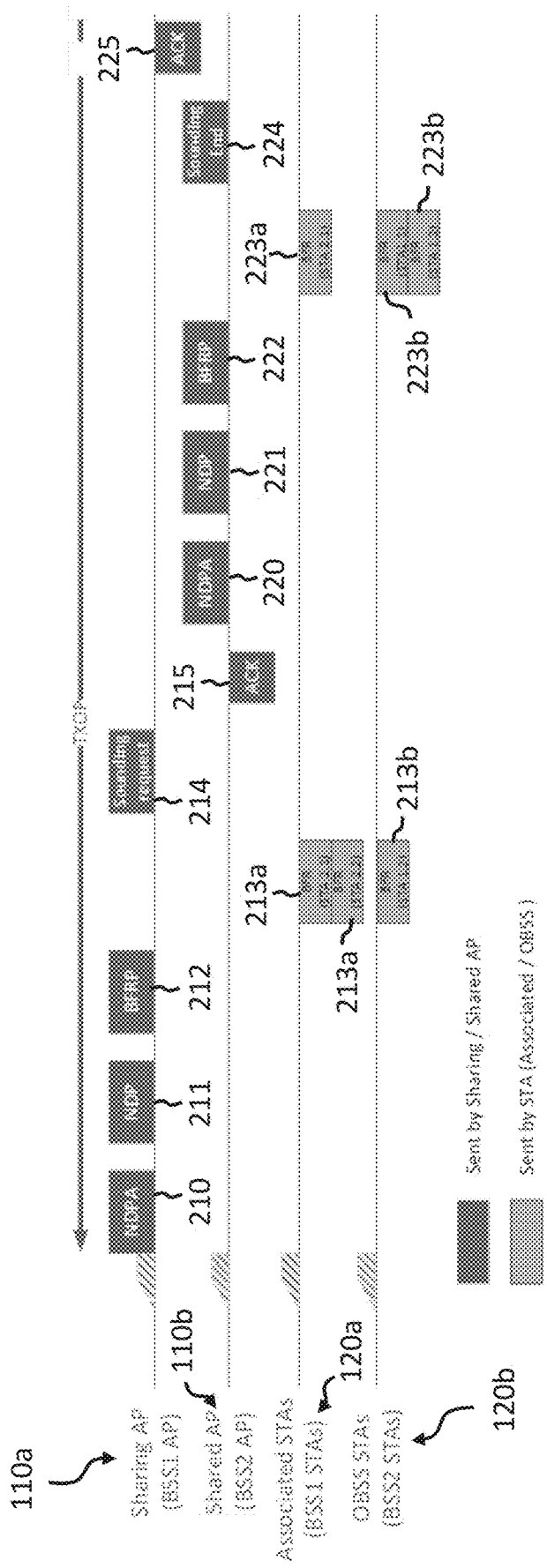
FIGS. 2a and 2b show sequence diagrams illustrating a M-AP coordinated transmission preceded by sequential sounding as implemented by the wireless APs and the wireless non-AP stations of the wireless communication system of FIG. 1.

More specifically, in the sequential sounding scheme illustrated in FIG. 2a the APs 110a, 110b belonging to the same M-AP set collect channel feedback information reports 213a, 213b, 223a, 223b from either their associated STAs 120a, 120b or the OBSS (Overlapping BSS) wireless stations. As already mentioned above, the OBSS STAs are Non-AP wireless stations that are associated with other APs within the M-AP set. After a contention period the sounding procedure is initiated by a C-BF NDPA frame 210 sent by the wireless AP, i.e. the sharing AP 110a followed by a NDP Sounding PPDU 211, which is used by the receiving stations to perform the channel measurement. Once polled by the wireless AP, i.e. the sharing AP 110a using a C-BRFP trigger frame 212, the stations send their corresponding coordinated Beamforming Reports (BFR) 213a, 213b to the wireless AP, i.e. the sharing AP 110a. As illustrated in FIG. 2a, this procedure is done sequentially by each of the APs 110a, 110b within the M-AP set (hence its name: C-BF Sequential Sounding). In other words, after a sounding request 214 from the sharing AP 110a and an acknowledgment message 215 from the shared AP 110b the same sounding procedure is repeated by the shared (i.e. the further wireless) AP 110b, i.e. emitting a C-BF NDPA frame 220, a Sounding NDP 221 and a C-BFRP trigger frame 222 and receiving, in response thereto, the C-BFRs 223a, 223b. The shared AP 110b may indicate the completion of its sounding procedure by a sounding end message 224 that may be acknowledged by the sharing AP 110a by means of an acknowledgment message 225. As will be appreciated from the sequential sounding procedure illustrated in FIG. 2a, each of the non-AP stations 120a, 120b within the M-AP set is required to perform channel measurements on a Sounding NDP frame, such as the NDP frame 211 or 221, for either its associated AP or the OBSS AP within the M-AP set. If polled by the AP within the M-AP set, using a C-BFRP trigger frame, the respective non-AP stations 120a, 120b shall respond directly with the corresponding CQI C-BFR report to the eliciting AP.

Figure 2B:

As illustrated in FIG. 2b, after the sequential sounding illustrated in FIG. 2a has been completed, the sharing AP 110a transmits an M-AP trigger frame 230 for the shared AP, indicating that after a SIFS duration, the shared AP shall start to transmit PPDUs to one or more of its associated STAs using the Coordinated Beamforming scheme. In addition, the M-AP trigger frame includes all the relevant parameters and allocated resources which will enable the shared AP to execute this transmission (concurrently with the transmission of the sharing AP to one or more of its associated STAs). A SIFS duration after the M-AP trigger frame 230, both the sharing AP 110a and the shared AP 110b concurrently start transmission of PPDUs 231,232 each to its associated STAs, using the coordinated beamforming scheme. As such, the processor of the sharing AP 110a pre-codes its transmitted signal such that it minimizes its interference to the OBSS wireless STA 120b that is within the coverage range of BSS1 (i.e. STA 1.2). Similarly, the processor of the shared AP 110b pre-codes its transmitted signal such that it minimizes its interference to the OBSS wireless STA 120a that is within the coverage range of BSS2 (i.e. STA 2.1). Each of the associated stations 120a of the sharing AP 110a responds to its received PPDU with a Multi-STA BACK frame 233a and similarly, each of the associated STAs 120b of the shared AP 110b responds to its received PPDU with a Multi-STA BACK frame 233b.

Figure 3A:
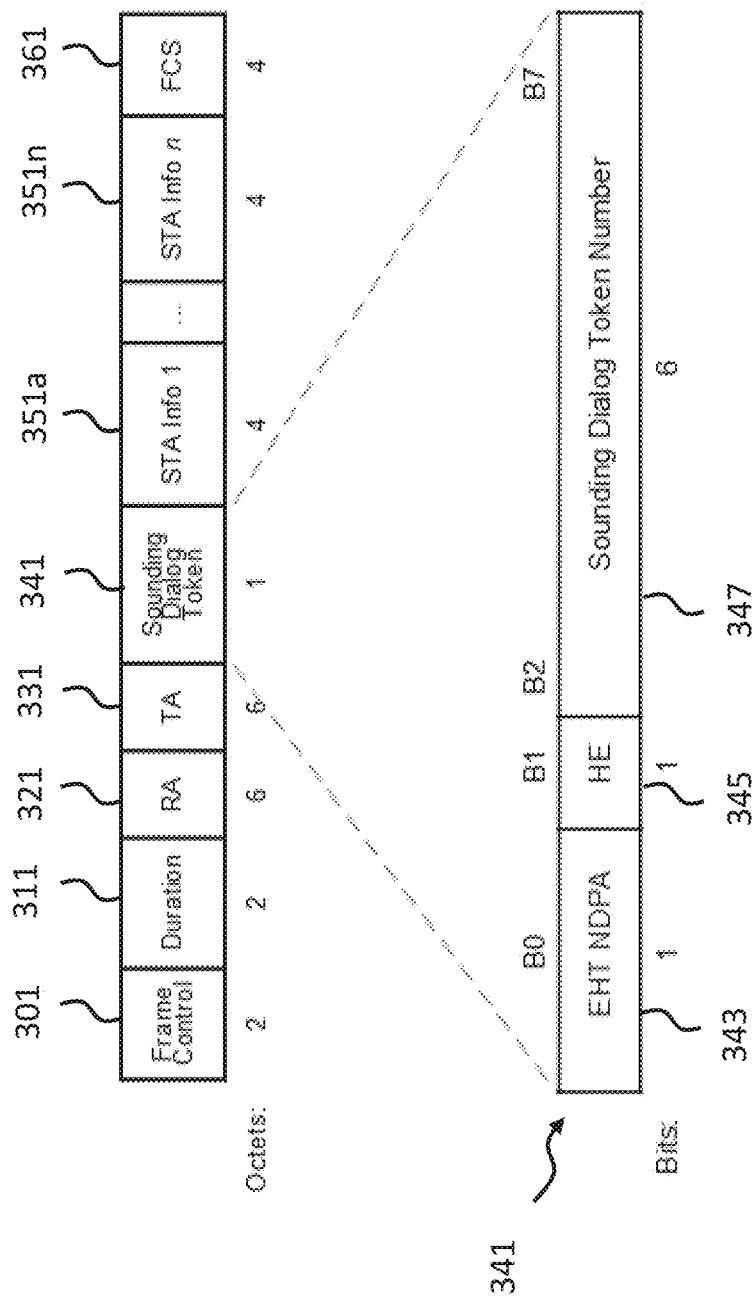
FIG. 3a shows a diagram illustrating the structure of a known EHT NPDA frame variant as well as the structure of a sounding dialog token field thereof in more detail.
Figure 3B:
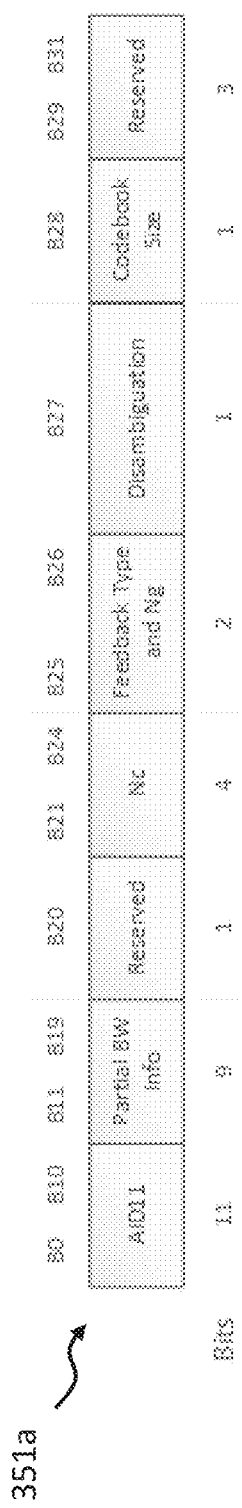

FIG. 3a shows a diagram illustrating the structure of an EHT variant of the NDPA frame 210, 220 used in the communication flow shown in FIG. 2a as suggested by TGbe11 Motion 137, #SP295. As can be taken from FIG. 3a, according to TGbe11 Motion 137, #SP295, the encoding value 11 for B0-B1 is created in a sounding dialog token field 341 of the NDPA frame variant. FIG. 3b shows in more detail the structure of a station information field 351a of the EHT NDPA frame shown in FIG. 3a. According to TGbe11 Motion 142, #SP304, the EHT STA Info field 351a has the following main features. A partial BW Info field can have a size of 7-9 bits. The codebook size may be increased, and the location of the Nc and Codebook Size fields may vary.

As can be taken from FIG. 3a, in addition to a frame Header portion, which includes a frame control field 301, a Duration field 311, a RA field 321 and a TA field 331, the NDPA payload part comprises the sounding dialog token field 341, at least one STA Information field 351a, . . . , 351n, and a FCS field 361. Moreover, the Sounding Dialog token field 341 comprises a EHT NDPA subfield 343, a HE subfield 345 and a sounding Dialog token Number subfield 347.

As can be taken from FIG. 3b, the STA Info field 351 may further comprise an AID11 subfield, the Partial BW Info subfield, an Nc subfield, a Feedback Type and Ng subfield, a Disambiguation subfield, a Codebook Size subfield and several reserved subfields.

As will be described in more detail below, embodiments disclosed herein are based on the idea to add a M-AP set identifier to all exchanged frames (which include PHY payload) during the C-BF sounding scheme illustrated in FIG. 2a, in particular the NDPA frames 210, 220 (herein referred to as C-BF NDPA frames 210, 220) and, according to further embodiments, the BFRP TFs 212, 222 (herein referred to as C-BF BFRP TFs 212, 222) and the BFRs 213a, 213b, 223a, 223b (herein referred to as C-BF BFRs 213a, 213b, 223a, 223b). Adding the M-AP set identifier to the C-BF NDPA frames 210, 220 and the C-BF BFRP TFs 212, 222 enables the wireless non-AP STAs 120a, 120b to receive frames transmitted by OBSS APs (within the same M-AP set). Adding the M-AP set identifier to the C-BF BFRs 213a, 213b, 223a, 223b enables the wireless APs 110a, 110b to receive management frames transmitted by the OBSS non-AP STAs 120a, 120b (within the same M-AP set) with BSSID field values different from Beamformer's BSSID.

Figure 4:
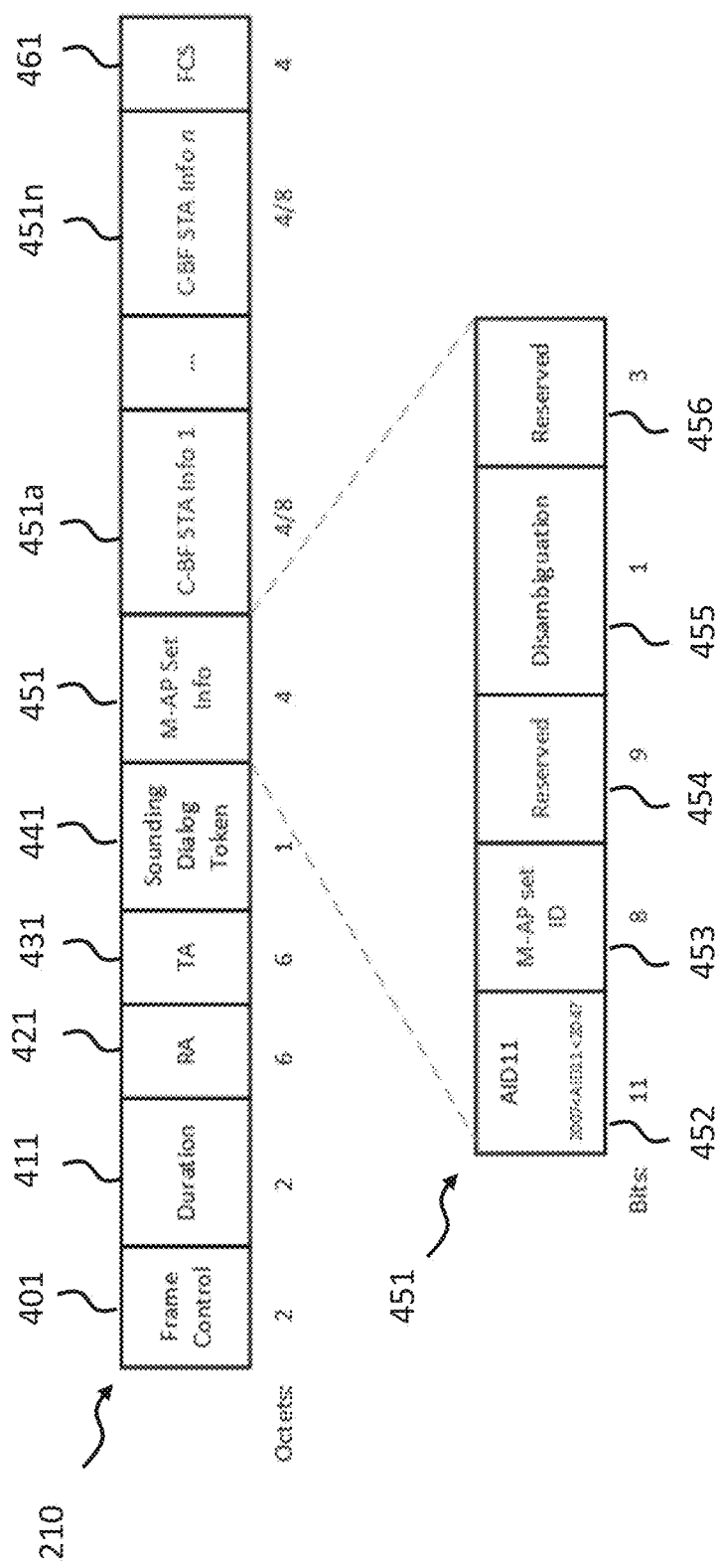
FIG. 4 shows a diagram illustrating the structure of a C-BF NPDA frame according to an embodiment as well as the structure of a M-AP set information field thereof in more detail.
Figure 6:
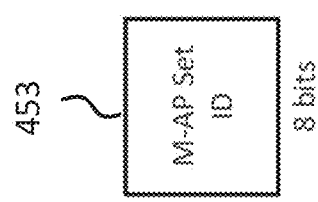
FIG. 6 shows a diagram illustrating the structure of a M-AP set identifier according to an embodiment.

Thus, according to an embodiment, the processing circuitry 111 of the wireless AP 110a, which, as already described above, is configured to share communication resources with the least one further wireless AP 110b within a Multi-AP set using the Coordinated Beamforming, C-BF, scheme once it has obtained a transmission opportunity (TXOP), is configured to generate the C-BF NDPA frame 210 in such a way that it comprises a Multi-AP set identifier, such as the Multi-AP set identifier field 453 illustrated in FIGS. 4 and 6 and described in more detail below. Moreover, as already described above in the context of FIG. 2a, the communication interface 113 of the wireless AP 110a is configured to transmit the C-BF NDPA frame 210 including the Multi-AP set identifier 453 to the one or more wireless non-AP stations 120a associated with the wireless AP 110a and/or to the one or more further wireless non-AP stations 120b, i.e. the OBSS (Overlapping BSS) wireless stations 120b associated with the at least one further OBSS wireless AP 110b within the Multi-AP set.

As will be appreciated, the concept of sharing a Transmission Opportunity (TXOP) as used herein is based on the following technological background. The Enhanced Distributed Channel Access Function (EDCAF) determines, using the enhanced distributed channel access (EDCA) method, when a frame in the transmit queue with the associated access category (AC) is permitted to be transmitted via the wireless medium (WM). Under the EDCAF, a STA (either AP, such as the APs 110a, 110b or non-AP) obtains an opportunity in the time domain to transmit through the Wireless Medium (WM) and is designated as TXOP (Transmit Opportunity) Holder. During this TXOP, it may use all of the resources (frequency, channels, etc.) for the initiated transmission. During the TXOP, only the other STAs that the TXOP Holder has initiated frames exchange with are allowed to respond (and they are designated as TXOP Responder). All other STAs on the WLAN are not allowed to transmit during this TXOP. Moreover, if the TXOP Holder is an Access Point, it may share the TXOP with more than a single associated STA and this operation is designated as TXOP Sharing (or also as Downlink Multi-User operation). In Multi Access Point (M-AP) the same concept of TXOP sharing is utilized to generate a concurrent transmission of multiple Access Points when one of the participated Access Points has obtained the TXOP (and now may share with other Access Points, rather than only with its some of its associated STAs). Coordinated Beamforming is one of the proposed schemes for the AP to share its resources during its obtained TXOP which is now being shared with other Access Points.

In the following further embodiments of the C-BF NDPA frames 210, 220 as used by the wireless AP 110a and the further wireless AP 110b will be described in more detail. As will be appreciated, however, at least some of these further embodiments may also apply to the other types of frames illustrated in FIG. 2a, such as the C-BF BFRP TFs 212, 222 and the C-BF BFRs 213a, 213b, 223a, 223b.

FIG. 4 shows a diagram illustrating the structure of the C-BF NPDA frame 210 (or the C-BF NDPA frame 220) according to an embodiment, which includes a M-AP set information field 451. As illustrated in FIG. 4, in an embodiment, the M-AP set information field 451 may follow a Sounding Dialog Token field 441 of the C-BF NPDA frame 210, 220 (an embodiment of the Sounding Dialog Token field 441 will be described in more detail in the context of FIG. 5). The M-AP set information field 451 comprises the M-AP set identifier 453. The M-AP set information field 451 may be distinguished from a conventional station information field (such as the station information field 351a of the NDPA frame shown in FIG. 3a) by using a special and unique AID11 value 452 having a value greater than 2007 and smaller than 2047. Further to the M-AP set identifier 453 and the special and unique AID11 value 452 the M-AP set information field 451 may comprise a disambiguation bit 455 (for VHT STA backwards compatibility). In addition to the M-AP set information field 451 the variant of the C-BF NDPA frame 210, 220 shown in FIG. 5 may comprise at least one C-BF STA Information field 451a, . . . , 451n, embodiments of which will be described in more detail below. Similar to the conventional NDPA frame shown in FIG. 3a, the C-BF NPDA frame 210 (or the C-BF NPDA frame 220) shown in FIG. 4 may comprise a frame Header portion, which includes a frame control field 401, a Duration field 411, a RA field 421 and a TA field 431, while the payload portion of the C-BF NPDA frame 210 (or the C-BF NPDA frame 220) may comprise the sounding dialog token field 441, the M-AP set information field 451, the at least one C-BF STA Information field 451a, . . . , 451n and the FCS field 461.

Figure 5:
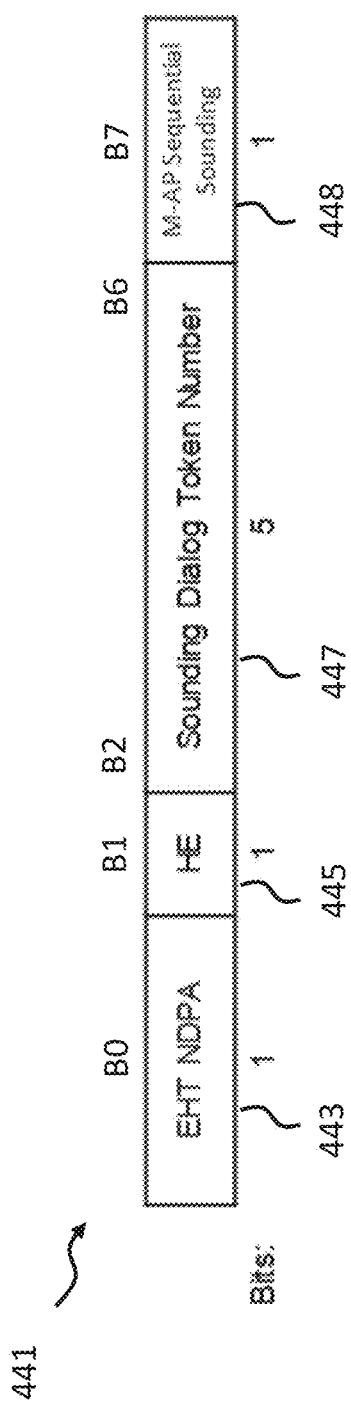
FIG. 5 shows a diagram illustrating the structure of a sounding dialog token field of the C-BF NDPA frame of FIG. 4 according to an embodiment.

FIG. 5 shows a diagram illustrating the structure of the sounding dialog token field 441 of the C-BF NDPA frame 210 of FIG. 4 according to an embodiment. In the embodiment shown in FIG. 5, the sounding dialog token field 441 of the NPDA frame 210 comprises an indicator 448 (referred to herein as M-AP sequential sounding field) indicative of the C-BF NDPA frame 210 comprising a Multi-AP set identifier field and C-BF STA Info fields. In the embodiment shown in FIG. 5, the sounding dialog token field 441 has a size of 8 bits, wherein the indicator 448 is defined by one of the bits, in particular B7 of the 8 bits of the sounding dialog token field 441. This may be implemented, for instance, by reducing the size of the sounding dialog token number 447 from the conventional size of 6 bits to a size of 5 bits. The Sounding Dialog token field 441 may further comprise an EHT NDPA subfield 443 and a HE subfield 445.

As illustrated in FIG. 4 as well as FIG. 6, the M-AP set identifier 453, which identifies the frames that OBSS EHT APs/OBSS EHT Non-AP STAs should receive and/or respond to in a C-BF sequential sounding scheme, may have a size of 8 bits. In an embodiment, the M-AP set identifier 453 may have a value in the range [2,255], while the values 0.1 may be reserved.

Figure 7:
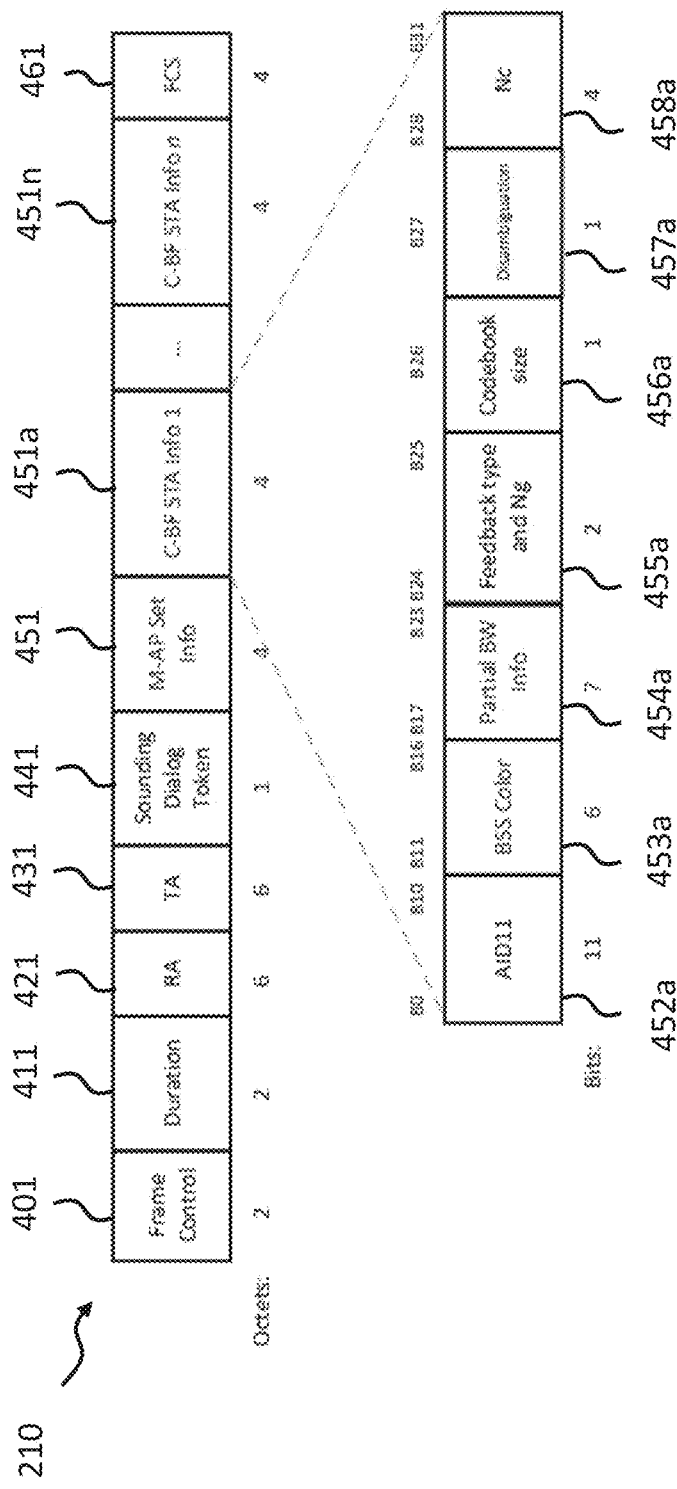
FIG. 7 shows a diagram illustrating the structure of a C-BF NPDA frame according to a further embodiment as well as the structure of a C-BF station information field thereof in more detail.

FIG. 7 shows a diagram illustrating a variant of the embodiment of the C-BF NPDA frame 210 shown in FIG. 4 (or the C-BF NPDA frame 220). In the embodiment shown in FIG. 7, the C-BF NPDA frame 210 (or the C-BF NDPA frame 220) comprises at least one station information field 451a (referred to as a C-BF station information field herein) having a size of 4 bytes (as in a conventional HE/EHT NDPA frame). The C-BF station information field 451a comprises an association identifier, AID, 452a (having a size of 11 bits) with a value in the range of 1 to 2007 and a BSS color field 453a (having a size of 6 bits). Similar to the conventional STA Info field 351 shown in FIG. 3b, the C-BF station information field 451a shown in FIG. 7 may further comprise a Partial BW Info subfield 454a, an Nc subfield 458a, a Feedback Type and Ng subfield 455a, a Disambiguation subfield 457a, and/or a Codebook Size subfield 456a.

Figure 8:
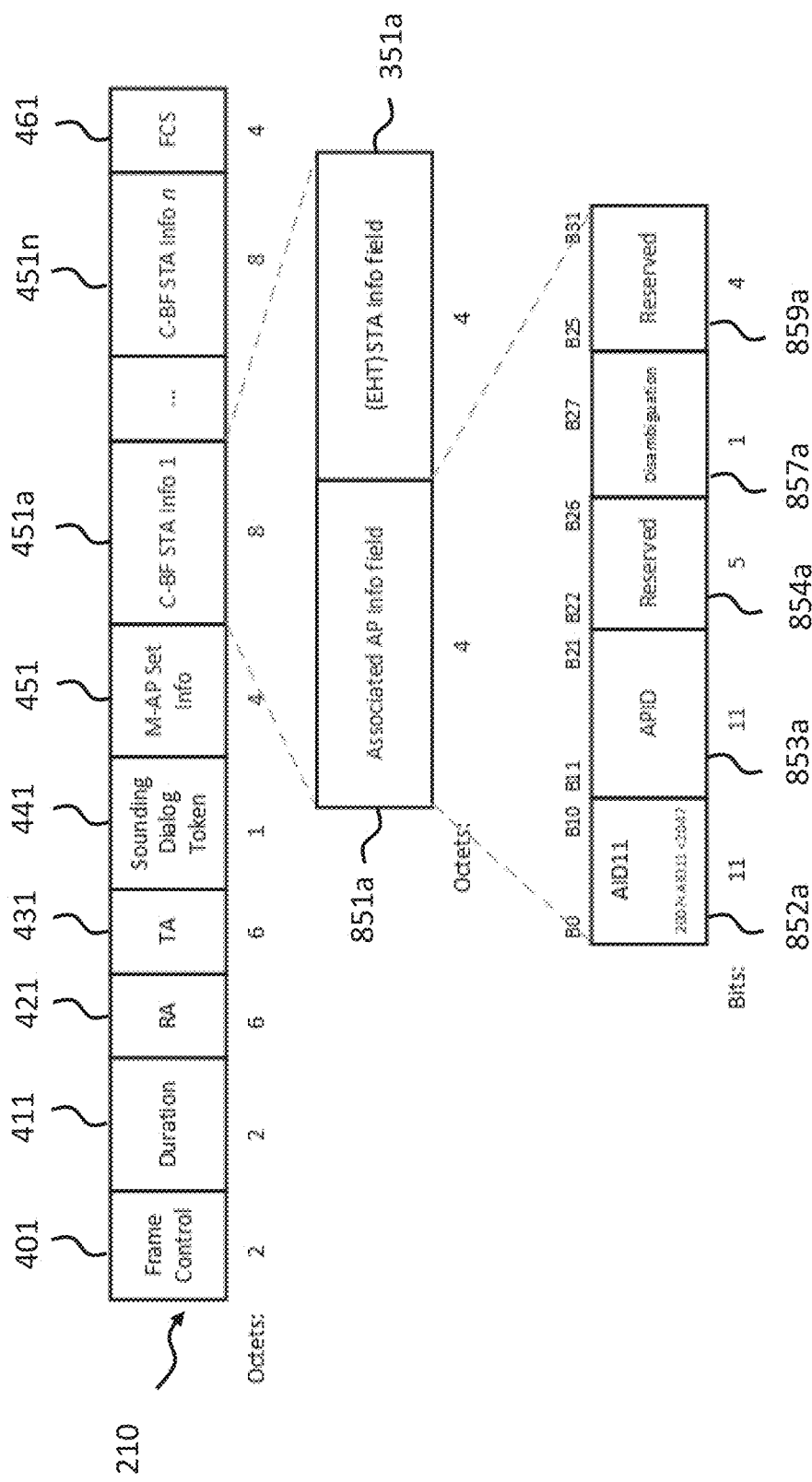
FIG. 8 shows a diagram illustrating the structure of a C-BF NPDA frame according to a further embodiment as well as the structure of a C-BF station information field thereof in more detail.

FIG. 8 shows a diagram illustrating a further variant of the embodiment of the C-BF NPDA frame 210 shown in FIG. 4 (or the C-BF NPDA frame 220). In the embodiment shown in FIG. 8, the C-BF NPDA frame 210 (or the C-BF NDPA frame 220) comprises at least one C-BF station information field 451a having a size of 8 bytes. In an embodiment, the first 4 bytes of the C-BF station information field 451a define an "Associated AP information field" 851a, while the last 4 bytes of the C-BF station information field 451a define the station information field 351a as used in the conventional EHT NDPA, as illustrated in FIGS. 3a and 3b. As can be taken from FIG. 8, in an embodiment, the "Associated AP information field" 851a may have a structure similar to a conventional STA information field and may include an AID11 value 852a (e.g. of size 11 bits; B0-B10), a unique AP identifier 853a (e.g. of size 11 bits as well; B11-B21) and a disambiguation bit 857a (as well as one or more reserved bits 854a, 859a). In an embodiment, a special value for the AID11 852a may be used, namely a value greater than 2007 and smaller than 2047.

Figure 9:
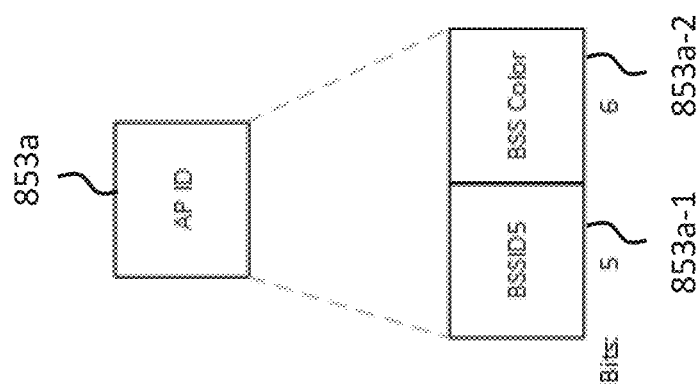
FIG. 9 shows a diagram illustrating the structure of a unique AP identifier according to an embodiment.

FIG. 9 shows a diagram illustrating the structure of the unique AP identifier 853a of FIG. 8 according to an embodiment. In the embodiment shown in FIG. 9, the AP identifier 853a is composed of the conventional BSS Color 853a-2 (having a size of 6 bits) and several least significant bits (LSBs) 853a-1 of the BSSID, such as the 5 LSBs 853a-1 of the BSSID as illustrated in FIG. 9. In other words, in the embodiment shown in FIG. 9, the 6 LSBs of the unique AP identifier 853*a* are the BSS Color 853*a*-2 assigned to the EHT AP 110*a*, 110*b*, while the 5 MSBs of the unique AP identifier 853*a* are the 5 LSBs 853*a*-1 of the EHT AP BSSID (BSSID is the 6-byte MAC address of the AP 110*a*, 110*b*). This has the advantage that the AP ID 853*a* can be easily defined by each of the APs 110*a*, 110*b* within the M-AP set. Being composed of the BSS Color 853*a*-2 (BSS Identifier), and 5 LSB 853*a*-1 of BSSID (AP absolute Identifier) allows defining the unique AP ID 853*a* within the M-AP set during the M-AP setup stage. The unique AP ID 853*a* is required only for the C-BF Sequential Sounding procedure and hence is used only if needed. Moreover, the AP ID 853*a* is unique in any M-AP set that the respective AP 110*a*, 110*b* is affiliated with.

In a further embodiment, the unique AP ID 853*a* may be obtained based on the addition of the EHT AP identifier within the M-AP set by using several LSBs of the BSSID, which is an AP absolute Identifier. For instance, in an embodiment, the 11 LSBs of the BSSID may be used for defining the unique AP ID 853*a*.

Figure 10:
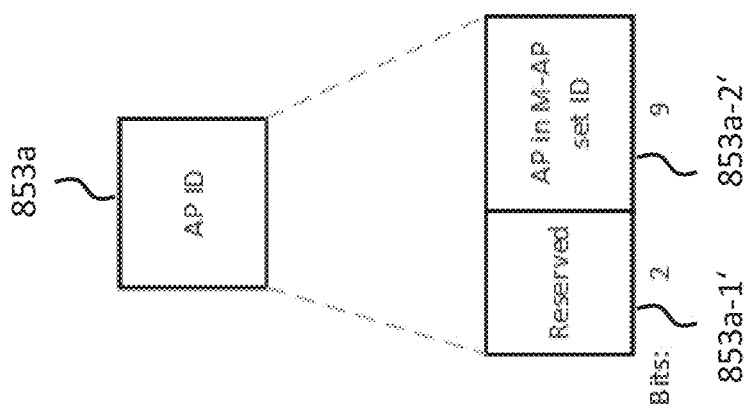
FIG. 10 shows a diagram illustrating the structure of a unique AP identifier according to a further embodiment.

FIG. 10 shows a diagram illustrating a further variant of the unique AP identifier 853*a* illustrated in FIG. 9. In the embodiment shown in FIG. 10, the unique AP identifier 853*a* may be an arbitrary number 853*a*-2' (of size 9 bits) generated or selected by the processing circuitry 111 of the wireless AP 110*a*. The 2 MSBs 853*a*-1' of the unique AP identifier 853*a* may be reserved.

As already described above, the features of the different embodiments of the C-BF NDPA frame 210 and the C-BF NDPA frame 220 as well as the unique AP identifier 853*a* described in the context of FIGS. 4 to 10 may be implemented in one or more of the other frames exchanged during the C-BF sounding procedure illustrated in FIG. 2*a*.

For instance, like the C-BF NDPA frame 210 illustrated in FIG. 4, the C-BF BFRP TFs 212, 222 may comprise a M-AP set identifier like the M-AP set identifier 453. This M-AP set identifier 453 may be implemented in a Trigger Dependent Common field of the C-BF BFRP TFs 212, 222. Moreover, the unique AP identifier (like the AP identifier 853*a*) may be included in a Trigger Dependent User Info field of the C-BF BFRP TFs 212, 222. In such an embodiment, the wireless APs 110*a*, 110*b* and the wireless non-AP stations 120*a*, 120*b* may be configured to implement a message processing rule to receive the C-BF BFRP TFs 212, 222, only if the received M-AP set identifier value matches the M-AP Set identifier value of the frame recipient.

Moreover, like the C-BF NDPA frame 210 illustrated in FIG. 4, the C-BF BFRs 213*a*, 213*b*, 223*a*, 223*b* illustrated in FIG. 2*a* may comprise an M-AP set identifier like the M-AP set identifier 453, for instance, in a "EHT Action" field. In such an embodiment, the wireless APs 110*a*, 110*b* and the wireless non-AP stations 120*a*, 120*b* may be configured to implement a message processing rule to receive the C-BF BFRs 213*a*, 213*b*, 223*a*, 223*b*, only if the received M-AP set identifier value matches the M-AP Set identifier value of the frame recipient.

Figure 11:
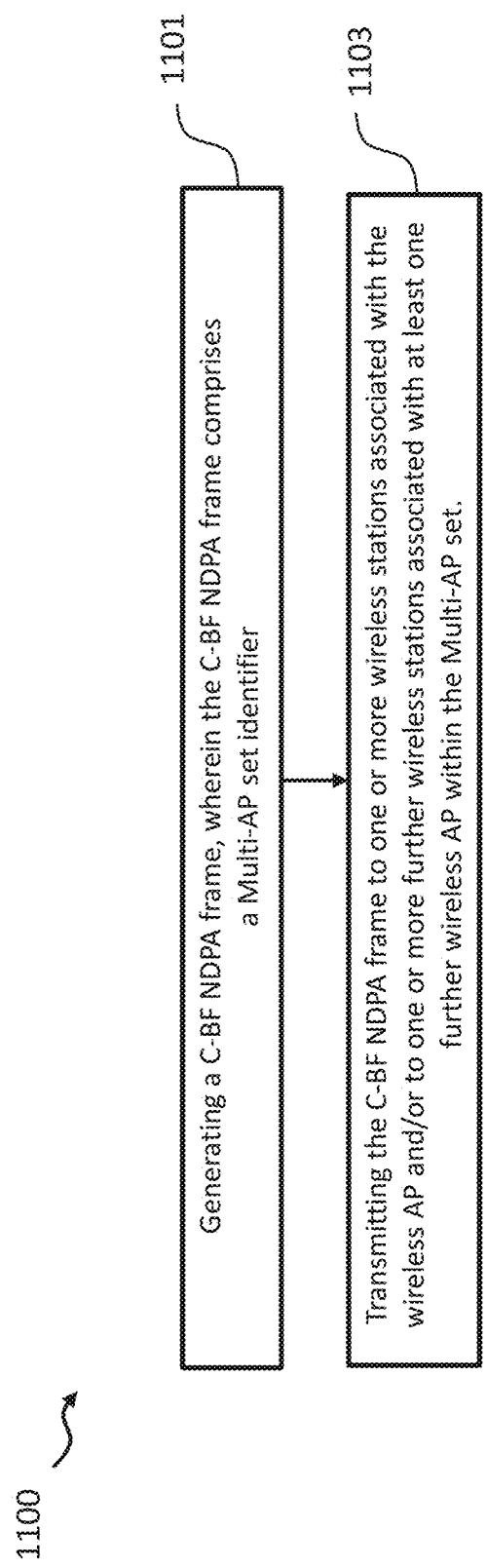
FIG. 11 is a flow diagram illustrating a method of operating a wireless AP according to an embodiment.

FIG. 11 is a flow diagram illustrating a method 1100 of operating the wireless AP 110*a* according to an embodiment. The method 1100 comprises the steps of generating 1101 the C-BF NDPA frame 210, 220, wherein the C-BF NDPA frame 210, 220 comprises the Multi-AP set identifier 453; and transmitting 1103 the C-BF NDPA frame 210, 220 to the one or more wireless stations 120*a* associated with the wireless AP 110*a* and/or to one or more further wireless stations 120*b* associated with the at least one further wireless AP 110*b* within the Multi-AP set.

Further features and embodiments of the method 1100 result directly from the structure and/or functionality of the wireless AP 110*a*, the further wireless AP 110*b* and/or the wireless non-AP stations 120*a*, 120*b* as well as their different embodiments described above.

Embodiments disclosed herein allow the wireless APs 110*a*, 110*b* sending either the C-BF NDPA frame 210, 220 with C-BF STA info fields or the C-BF TF 212, 222 with User Info fields for Non-AP EHT STAs from different BSSs within the M-AP set, which have the same AID11/AID12. Moreover, embodiments disclosed herein enable the EHT non-AP STAs 120*a*, 120*b* to receive frames sent by the OBSS APs 110*a*, 110*b* within the M-AP set. Moreover, embodiments disclosed herein enable a unique Identification of the wireless AP 110*a*, 110*b* within the M-AP set.

The person skilled in the art will understand that the "blocks" ("units") of the various figures (method and apparatus) represent or describe functionalities of embodiments of the present disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described embodiment of an apparatus is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the invention may be integrated into one processing unit, or each of the units may exist alone physically, or two or more units are integrated into one unit.

What is claimed is:

1. A wireless access point (AP), configured to share a transmission opportunity with at least one further wireless access point within a Multi-AP set, using a Coordinated Beamforming (C-BF) scheme, wherein the wireless AP comprises:
   a processing circuitry, configured to generate a C-BF Null Data PPDU Announcement (NDPA) frame, wherein the C-BF NDPA frame comprises a Multi-AP set identifier; and
   a communication interface, configured to transmit the C-BF NDPA frame to one or more wireless stations associated with the wireless AP and/or to one or more further wireless stations associated with the at least one further wireless AP within the Multi-AP set.

2. The wireless AP of claim 1, wherein the C-BF NDPA frame comprises an indicator indicative of the NDPA frame comprising the Multi-AP set identifier.

3. The wireless AP of claim 2, wherein the C-BF NDPA frame comprises a sounding dialog token field, and wherein the sounding dialog token field comprises the indicator.

4. The wireless AP of claim 3, wherein the sounding dialog token field comprises a plurality of bits and wherein the indicator is one bit of the plurality of bits of the sounding dialog token field.

5. The wireless AP of claim 3, wherein the C-BF NDPA frame comprises a Multi-AP set information field, wherein the Multi-AP set information field follows the sounding dialog token field and comprises the Multi-AP set identifier.

6. The wireless AP of claim 5, wherein the Multi-AP set information field further comprises an association identifier (AID) with a value greater than 2007 and less than 2047, for identifying the Multi-AP set information field.

7. The wireless AP of claim 5, wherein the Multi-AP set identifier is an arbitrary number.

8. The wireless AP of claim 5, wherein the Multi-AP set information field has a size of 4 bytes.

9. The wireless AP of claim 1, wherein the communication interface is further configured to: transmit a Sounding Null Data PPDU after a Short Interframe Space (SIFS) duration following the transmission of the C-BF NDPA frame.

10. The wireless AP of claim 1, wherein the processing circuitry is further configured to: generate a Coordinated beamforming feedback report poll (C-BFRP)trigger frame, wherein the C-BFRP trigger frame comprises the Multi-AP set identifier, and
wherein the communication interface is configured to: transmit the C-BFRP trigger frame to the one or more wireless stations associated with the wireless AP, and/or to the one or more further wireless stations associated with the at least one further wireless AP within the Multi-AP set.

11. The wireless AP of claim 5, wherein the C-BF NDPA frame further comprises a C-BF station information field, wherein the C-BF station information field has a size of 4 bytes and comprises an association identifier (AID) with a value in the range of 1 to 2007 and a basic service set (BSS) color field.

12. The wireless AP of claim 5, wherein the C-BF NDPA frame further comprises a C-BF station information field, wherein the C-BF station information field has a size of 8 bytes, and wherein the first 4 bytes of the C-BF station information field comprise an associated AP information field, and the remaining 4 bytes of the C-BF station information field comprise an Extremely High Throughput (EHT) station information field.

13. The wireless AP of claim 12, wherein the associated AP information field comprises an association identifier (AID) with a value greater than 2007 and less than 2047.

14. The wireless AP of claim 1, wherein the processing circuitry is further configured to: combine a plurality of basic service set (BSS) color bits of the wireless AP with one or more least significant bits of a BSS identifier (BSSID) of the wireless AP, for obtaining an identifier of the wireless AP within the Multi-AP set, and to include the identifier of the wireless AP in the C-BF NDPA frame and in a C-BFRP trigger frame.

15. The wireless AP of claim 1, wherein the processing circuitry is further configured to: select a plurality of the least significant bits of a basic service set identifier (BSSID) of the wireless AP, for obtaining an identifier of the wireless AP within the Multi-AP set and to include the identifier of the wireless AP in the C-BF NDPA frame and in a C-BFRP trigger frame.

16. The wireless AP of claim 1, wherein the processing circuitry is further configured to: generate a random number for obtaining a unique identifier of the wireless AP within the Multi-AP set, and to include the identifier of the wireless AP in the C-BF NDPA frame and in a C-BFRP trigger frame.

17. The wireless AP of claim 1, wherein the processing circuitry is further configured to: receive one or more C-BF report frames from the one or more wireless stations associated with the wireless AP, and/or from the one or more further wireless stations associated with the at least one further wireless AP within the Multi-AP set, wherein each of the one or more C-BF report frames comprises a Multi-AP set identifier.

18. The wireless AP of claim 17, wherein the processing circuitry is configured to: process the one or more C-BF report frames received from the one or more wireless stations associated with the wireless AP and/or from the one or more further wireless stations associated with the further wireless AP, based on the Multi-AP set identifier value of the one or more C-BF report frames matching a Multi-AP set identifier value of the wireless AP.

19. A wireless non-AP station associated with a wireless access point (AP) that is sharing its transmission opportunity (TXOP) with at least one further OBSS wireless AP or that is being shared the TXOP within a Multi-AP set using a Coordinated Beamforming (C-BF) scheme, wherein the wireless station comprises:
a communication interface configured to receive a C-BF Null Data PPDU Announcement (C-BF NDPA) frame, from the wireless AP or from the at least one further wireless AP within the Multi-AP set, wherein the C-BF NDPA frame comprises a Multi-AP set identifier.

20. The wireless non-AP station of claim 19, wherein the communication interface is further configured to receive a Sounding Null Data PPDU (NDP) from the wireless AP or from the at least one further wireless AP within the Multi-AP set, wherein the Sounding NDP is transmitted after a Short Interframe Space (SIFS) period following the transmission of the C-BF NDPA frame.

* * * * *